US005526298A

United States Patent [19]

Mukohzaka

[11] Patent Number: 5,526,298

[45] Date of Patent: Jun. 11, 1996

[54] OPTICAL ASSOCIATIVE MEMORY

[75] Inventor: Naohisa Mukohzaka, Shizuoka, Japan

[73] Assignee: Hamamatsu Photonics K.K., Shizuoka, Japan

[21] Appl. No.: 870,760

[22] Filed: Apr. 20, 1992

Related U.S. Application Data

[63] Continuation of Ser. No. 613,949, Nov. 13, 1990, abandoned, which is a continuation of Ser. No. 204,350, Jun. 9, 1988, abandoned.

[30] Foreign Application Priority Data

| | | | |
|---|---|---|---|
| Jun. 10, 1987 | [JP] | Japan | 62-144341 |
| Jun. 10, 1987 | [JP] | Japan | 62-144342 |
| Jun. 10, 1987 | [JP] | Japan | 62-144343 |
| Jun. 10, 1987 | [JP] | Japan | 62-144344 |
| Jun. 10, 1987 | [JP] | Japan | 62-144345 |
| Jun. 10, 1987 | [JP] | Japan | 62-144346 |
| Jun. 10, 1987 | [JP] | Japan | 62-144347 |
| Jun. 10, 1987 | [JP] | Japan | 62-144348 |
| Sep. 1, 1987 | [JP] | Japan | 1-218132 |
| Sep. 1, 1987 | [JP] | Japan | 1-218133 |
| Sep. 1, 1987 | [JP] | Japan | 1-218134 |
| Sep. 1, 1987 | [JP] | Japan | 1-218135 |

[51] Int. Cl.$^6$ .......... G06E 3/00; G06K 9/00

[52] U.S. Cl. .......... 364/807; 365/49; 395/25

[58] Field of Search .......... 364/713, 807; 395/25; 365/49

[56] References Cited

U.S. PATENT DOCUMENTS

| | | | |
|---|---|---|---|
| 3,492,652 | 1/1970 | Van Heerden | 340/172.5 |
| 3,766,533 | 10/1973 | Black et al. | 340/172.5 |
| 3,868,655 | 2/1975 | Filippazzi | 340/173 AM |
| 3,950,733 | 4/1976 | Cooper et al. | 364/900 |
| 4,017,853 | 4/1977 | Brandao et al. | 343/5 DP |
| 4,325,257 | 4/1982 | Kino et al. | 73/626 |
| 4,446,425 | 5/1984 | Valdmanis et al. | 324/77 K |
| 4,449,193 | 5/1984 | Tournois | 364/604 |
| 4,603,293 | 7/1986 | Mourou et al. | 324/96 |
| 4,618,819 | 10/1986 | Mourou et al. | 324/77 K |
| 4,651,293 | 3/1987 | Kato | 364/602 |
| 4,701,879 | 10/1987 | Scarr | 365/49 |
| 4,739,496 | 4/1988 | Marom et al. | 365/125 |
| 4,748,674 | 5/1988 | Freeman | 382/14 |
| 4,750,153 | 6/1988 | Owechko et al. | 365/125 |
| 4,862,406 | 8/1989 | Fisher | 364/807 |

FOREIGN PATENT DOCUMENTS 0197196 10/1986 European Pat. Off. .

OTHER PUBLICATIONS

Warde, C. et al., "Optical Information Processing Characteristics of the Microchannel Spatial Light Modulator", *Applied Optics*, vol. 20, No. 12, Jun. 15, 1981, pp. 2066–2074.

(List continued on next page.)

*Primary Examiner*—Stephen M. Baker
*Attorney, Agent, or Firm*—Finnegan, Henderson, Farabow, Garrett & Dunner

[57] ABSTRACT

An optical associative memory in which processing data by optical operations permits simplification in circuit arrangement, a shorter processing time and the generation of successive outputs. The associative memory includes multiplying system for multiplying an input signal or a feedback signal, and a magnifying system for magnifying the input signal or said feedback signal. The associative memory also includes a first operational device for producing a first signal representing a product of the output of said multiplying system and the output of said magnifying system, a memory means for storing two-dimensional information and for outputting the content thereof as required, a second operational device for producing a product of the output of the memory means and the output of the multiplying system, an inversely multiplying system for inversely multiplying the output from said second operational device, a threshold memory for storing, while thresholding, the output from the the inversely multiplying system, and for outputting the content thereof as required and a feedback loop for feeding back the output of the threshold memory as the feed back signal.

11 Claims, 13 Drawing Sheets

OTHER PUBLICATIONS

Fisher, A., et al., "Implementations of Adaptive Associative Optical Computing Elements", *SPIE vol. 625 Optical Computing* (1986), pp. 196–204.

Psaltis, D., et al., "Optical information processing based on an associative–memory model of neural nets . . . ", *Optics Letters,* vol. 10, No. 2, Feb. 1985, pp. 98–100.

Farhat, N., et al. "Optical Inplementations of Associative Memory . . . ", in *Optical Signal Processing,* Horner, J., ed., Academic Press, pub. 1987, pp. 129–162.

Warde, C., et al., "Spatial Light Modulators", in *Optical Signal Processing,* pp. 487–493.

"Subpicosecond Electrooptic Sampling: Principles and Applications" by Valdmanis et al, IEEE Jnl. of Quantum Elec. vol. QE–22, No. 1, Jan. 1986, pp. 69–78.

"Picosecond electro–optic sampling system" by Valdmanis et al, Appl. Phys. Lett. 41(3), 1 Aug. 1982, pp. 211–212.

"Subpicosecond Electrical Sampling" by Valdmanis et al, IEEE Jnl. of Quantum Elec., vol. QE–19, No. 4, Apr. 1983, pp. 664–667.

"Electro–optic Sampling With Picosecond Resolution" by Kolner et al, Electronics Letters, 21st Jul. 1983, vol. 19, No. 15, pp. 574–575.

"Advances in Streak Camera Instrumentation for the Study of Biological and Physical Processes" by Tsuchiya, IEEE Jnl of Quantum Electronics, vol. QE–20, No. 12, Dec. 1974, pp. 1516–1528.

"High–Speed Optical Electronics: The Picosecond Optical Oscilloscope" by Valdmanis, Solid State Technology/Test & Measurement World, Nov. 1986, pp. 540–544.

"Electro–Optic Sampling: Testing Picosecond Electronics Part 1. Principles and Embodiments" by Valdmanis et al, Laser Focus/Electro–Optics, Feb. 1986, pp. 84–96.

"Electro–Optic Sampling: Testing Picosecond Electronis Part 2. Applications" by Vladmanis et al, Laser Focus/ Electro–Optics, Mar. 1986, pp. 96–106.

"Subpicosecond Electrical Sampling and Applications" by Valdmanis et al, Picosecond Optoelectronic Devices, 1984, pp. 249–270.

"Picosecond Electro–Electron Optic Oscilloscope" by Williamson et al Proc. Conf. Picosecond Electron. Optoelectron. (N.Y. Springer–Verlag, 1985), pp. 58–61.

"Electrooptic Sampling in GaAs Integrated Circuits" by Kolner et al. IEEE Jnl. of Quantum Electronics, vol. QE–22, No. 1, Jan. 1986, pp. 79, 93.

"Noncontact Electro–Optic Sampling with a GaAs Injection Laser" by Nees et al, Electronics Letters, 14th Aug. 1986, vol. 22, No. 17, pp. 918–919.

"Optical Associatron: A Simple Model for Optical Associative Memory", Ishikawa et al., Applied Optics, 15 Jan. 1989, vol. 28, No. 2, pp. 291–301.

OPTICAL ASSOCIATIVE MEMORY

This application is a continuation, of application Ser. No. 07/613,949 filed Nov. 13, 1990, now abandoned, which application is a continuation, of application Ser. No. 07/204,350, filed Jun. 9, 1988, now abandoned.

FIELD OF THE INVENTION

The present invention relates to an optical associative memory.

BACKGROUND OF THE INVENTION

Conventional memories used in computers generally employ a method in which information stored in a memory is accessed by specifying the address corresponding to the location of the information in the memory. This type of memory device has a disadvantage in that data previously stored at a location may not be recovered once new information has been stored at the location and the data can only be accessed by specifying corresponding address regardless of the content of data stored therein. To solve this problem, associative memories have been developed wherein information is stored and searched on the basis of a reference input supplied from the outside. The reference input comprises part of the information stored or to be stored and all entries in the memory can be searched in one clock cycle.

Many associative memories have been developed and used as part of a computer memory, and are intended for storing electric digital signals. Such memories are formed as an electric integrated circuit. A scanning operation is necessitated when pattern information is involved, and this requires a much longer time in processing the data and large-scaled data processing in a parallel mode. It has been impossible to obtain outputs successively. Further, due to the fact that a number of arithmetic circuits are required, there may be difficulty in wiring among the circuits.

SUMMARY OF THE INVENTION

An object of the present invention is to solve the above-mentioned drawbacks of associative memories.

Another object of the present invention is an optical associative memory in which processing data by optical operations permits simplification in circuit arrangement, a shorter processing time and the generation of successive outputs.

A further object of the present invention is to provide a spatial coding system for all calculations in which two-dimensional data is used.

These and other objects are achieved by an optical associative memory comprising, a multiplying system for multiplying an input signal or a feedback signal, an magnifying system for magnifying said input signal or said feedback signal, a first operational device for producing a first signal representing a product of the output of said multiplying system and the output of said magnifying system, a memory means for storing two-dimensional information and for outputting the content thereof as required, a second operational device for producing a product of the output of said memory means and the output of said multiplying system, an inversely multiplying system for inversely multiplying the output from said second operational device, a threshold memory for storing, while thresholding, the output from the said inversely multiplying system, and for outputting the content thereof as required and a feedback loop for feeding back the output of said threshold memory as said feed back signal.

BRIEF DESCRIPTION OF THE DRAWINGS

The manner by which the above objects and other objects, features, and advantages of the present invention are attained will be apparent from the following detailed description when it is considered in view of the drawings, wherein:

FIGS. 2(A) to 5(A) are timing charts for the memorizing processings in the first to fourth embodiments of FIGS. 2 to 5, respectively;

FIGS. 2(B) to 5(B) are timing charts for the recalling processings in the first to fourth embodiments of FIGS. 2 to 5.

DETAILED DESCRIPTION

Figure 1:
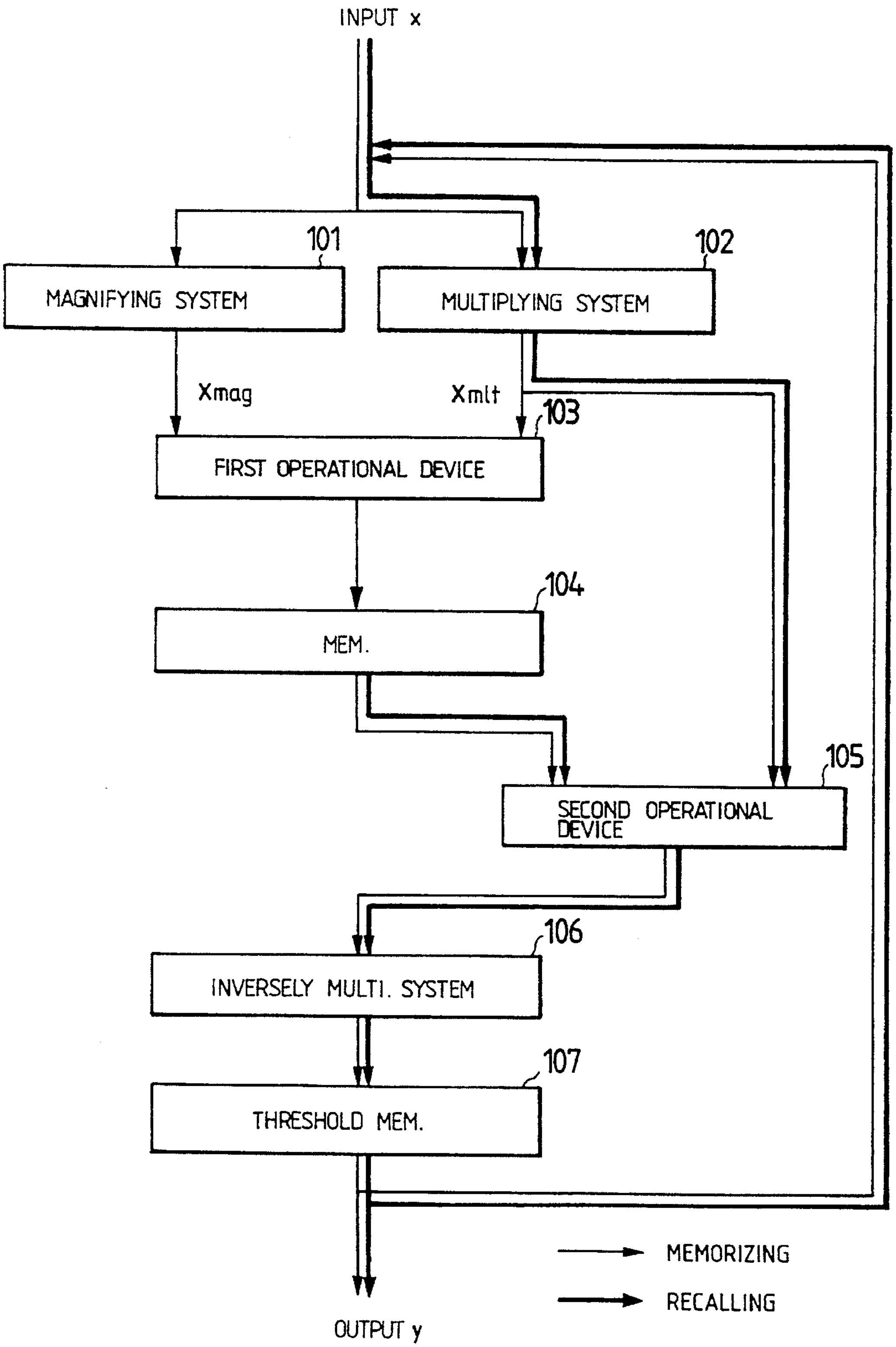
FIG. 1 is a block diagram for showing an embodiment of an associative memory according to the invention.

An optical associative memory according to the present invention converts a correlation matrix pattern, obtained from a reference pattern through electrical operation, into an optical pattern and stores the optical pattern. An optical recall pattern is produced through optical matrix operations on the basis of the optical pattern stored and the reference pattern. The optical recall pattern is then converted into an electrical recall pattern, and is fed back with a-predetermined learning gain to produce a correlation matrix pattern from the electrical recall pattern and the autocorrelation of the reference pattern. The correlation matrix of the reference pattern is memorized by repeating sequentially the above-mentioned process.

The optical associative memory according to the present invention converts the electrical reference pattern into the optical reference pattern, and then produces an optical recall pattern through optical matrix operation on the basis of this optical reference pattern and the stored correlation matrix pattern. Thus, a complete pattern can be recalled from an incomplete reference pattern by converting the optical recall pattern into the electrical recall pattern.

The principals of an optical associative memory according to the present invention will first be described as follows. The present invention employs an autocorrelation matrix for implementing associative storage in which a memory matrix is formed through autocorrelation of the content to be stored.

The operation in memory is expressed by the following equation:

$$M=\Sigma x\cdot x' \quad (1)$$

where x is an input vector indicative of the content to be stored, x' is the transpose vector of x, and M is a memory matrix. That is, the autocorrelation of the content to be stored is obtained and then M is obtained by adding this autocorrelation over and over again.

When recalling information, operating with the storage matrix M permits the recall of an entire information set through the use of only a portion thereof. The recall operation is expressed by the following equation:

$$y=\phi(M\cdot x) \quad (2)$$

where y represents an output vector, x an input vector, and $\phi$ a thresholding operation. Even when x is incomplete, i.e., missing some portion of the data, by means of the M·x, operation of recall data y close to the original data x can be obtained with the missing portion recovered. Additionally, data having higher than a predetermined level of quality is collected through thresholding operation of $\phi$ thereby eliminating noise portions.

In recall in accordance with a memory matrix obtained from Eq. (1) above, the following sequential calculation method is utilized if separation is not sufficient. In the method, the memory matrix is formed for better separation as follows.

$$M_{n+1}=M_n+\alpha[\{x-\phi(M_n\cdot x)\}x] \quad (3)$$

where $\alpha$ is a learning gain. $M_{n+1}$ is the (n+1)the value of M, and can be obtained by modifying Mn with the correlation between x' and a recall error component. The correlation, called learning pattern, is multiplied by a learning gain $\alpha$, and the recall error component is the difference between x and $\phi(M_n\cdot x)$. The learning gain $\alpha$ is selected such that $M_n$ converges. Thus, operating in accordance with Eq. (3) until $M_n$ converges provides the correlation matrix with an improved separation. The memory matrix is formed by autocorrelating the content to be stored, and thus the entire information can be recalled from a portion of the information by taking correlation with this memory matrix.

Figure 6:
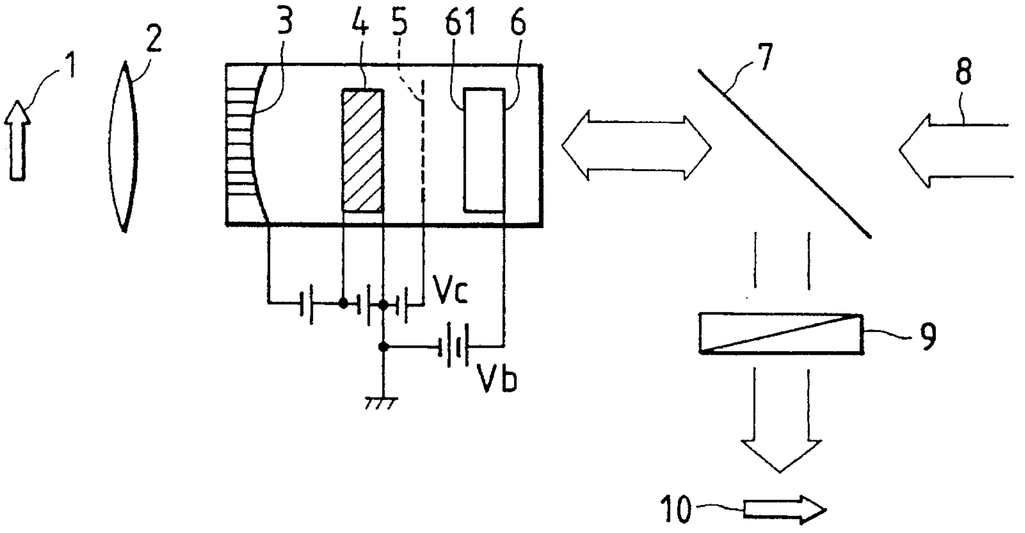
FIG. 6 is a diagram for illustrating an arrangement of a spatial light modulation tube that is a fundamental structural element of an associative memory according to the invention.

FIG. 6 is a diagram for illustrating the arrangement and operation of a spatial light modulation tube, which is a fundamental structural element of an optical associative memory according to the present invention. An input image 1 is imaged by a lens 2 onto a photocathode 3. The electrons emitted from the photocathode 3 pass through a microchannel plate 4, a mesh electrode 5, and strike a charge storage surface 61 of a crystal 6. A half mirror 7 is provided in the optical path between the crystal 6 and a monochromatic light 8. An output image 10 is formed from light passing through an analyzer 9.

In FIG. 6, the input image 1 incident upon the photocathode 3 of the spatial light modulation tube through the lens 2 is converted into a photoelectron image. This photoelectron image is multiplied at the microchannel plate 4, and forms a charge pattern on the charge storage surface 61 of the crystal 6. The electric field transverse the crystal 6 is distributed in response to the charge pattern to cause the index of refraction of the crystal 6 to vary due to the Pockels effect. When linearly polarized monochromatic light from the light 8 is applied to the crystal 6, the light reflected by the charge storage surface 61 is polarized differently due to birefringence of the crystal 6 and the output image 10 will have a light intensity in accordance with the light intensity of the input image 1 if the light reflected by the charge storage surface 6 is allowed to pass through the analyzer 9. The major functions of the spatial light modulation tube associated with the present invention are storage, subtraction, and thresholding, which will described as follows.

(A) Storage function

A spatial light modulation tube provides a storage function for maintaining charge distribution on the surface of an electrooptic crystal for an extended period of time. The crystal 6 exhibits a very high electrical resistance, and thus the charge distribution on the charge storage surface 61 can be maintained for more than several days.

(B) Subtraction function

Figure 7:
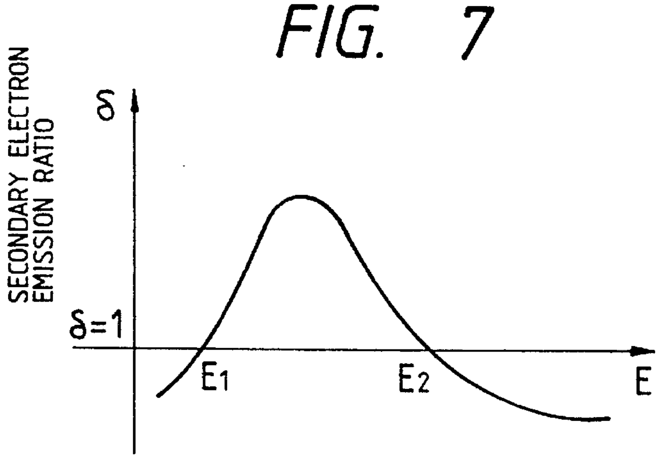
FIG. 7 is a diagram for showing secondary electron emission characteristics of the crystal surface of a spatial light modulation tube.

The spatial light modulation tube can form selectively positive or negative charge distribution on the surface of the electrooptic crystal. FIG. 7 is a graph for showing the property of secondary electron emission of an electrooptic crystal. As shown in FIG. 7, if a primary electron energy E incident upon the charge storage surface 61, is either smaller than a first crossover point E1 or larger than a second crossover point E2, then the crystal surface is negatively charged since the number of the primary electrons is larger than that of the secondary electrons emitted from the crystal surface ($\delta<1$). If the energy of the primary electrons is between E1 and E2, then the number of the secondary electrons is larger than that of the primary electrons ($\delta>1$) and the crystal surface is thus positively charged.

Writing data based on positively and negatively charged potential is effected by controlling the voltage of Vc and Vb as shown in FIG. 6. The subtraction function is implemented by either charging the crystal surface negatively and then writing a positive charge on the surface or first charging the crystal surface positively and then writing a negative charge on the crystal surface. The degree of subtraction can be controlled by varying the light intensity when it is incident, varying the duration of the voltage applied to the microchannel plate 4, or varying the magnitude of the voltage applied to the microchannel plate 4.

(C) Real time thresholding-adjusting function

A real time thresholding operation is controlled by adjusting the voltages Vb and Vc. When the voltage Vb, shown in FIG. 6, is decreased, the potential of the charge storage surface 61 also decreases. The voltage Vc of the mesh electrode 5 is set to low voltage of about 0.1 kV. When the Vb is decreased below 0.1 kV, the surface 61 of the crystal 6 becomes negative thus electrons cannot reach the surface 61. However, if the Vb is gradually decreased linearly, then the electrons in accordance with intensity of the light incident can reach the crystal surface 61 to thereby decrease the potential of the crystal surface 61. Depending on the amount of electrons that reach the surface 61, that is, light intensity incident upon the photocathode 3, some portion of the crystal surface 61 will be negative, and writing information is thus not effected. On the other hand, the other portions of the crystal surface will not be negative, writing information is thus effected. In other words, threshold operation is effected in accordance with the intensity of the incident light.

(D) AND operation function by real time thresholding operation

Figure 8:
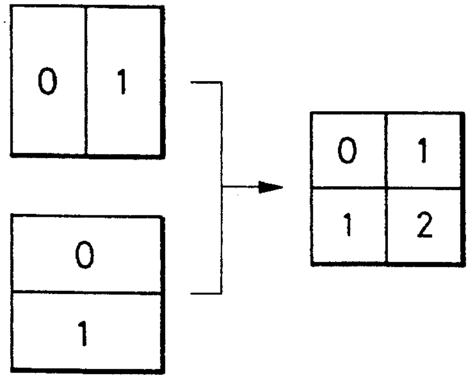
FIGS. 8 and 9 are diagrams for illustrating AND operation based on real time hard clipping function of a spatial light modulation tube.
Figure 9:
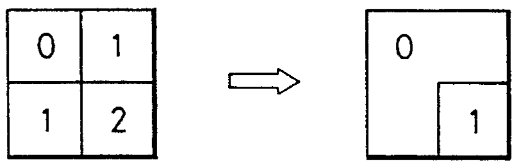

The spatial light modulation tube has real time thresholding operation function as described. This function is utilized to effect AND operation as follows. That is, as shown in FIG. 8, superimposing two inputs causes three levels of 0, 1 and 2 of incident intensity of light incident. The real time thresholding operation at level 2 results in an ANDed data as shown in FIG. 9.

The other elements constituting the present invention will be described as follows.

(1) Two-Dimensionally Magnified image formation system

Figure 10:
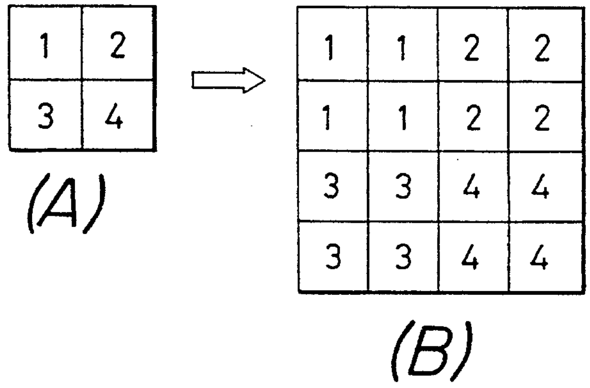
FIGS. 10(A) and 10(B) is a diagram for illustrating a magnifying system.

Such an input image pattern of 2×2 as shown in FIG. 10(A) is projected in enlargement into such a 4×4 image pattern as shown in FIG. 10(B). This is actually effected through a lens system for example.

(2) Multiple image reproduction system

Figure 11:
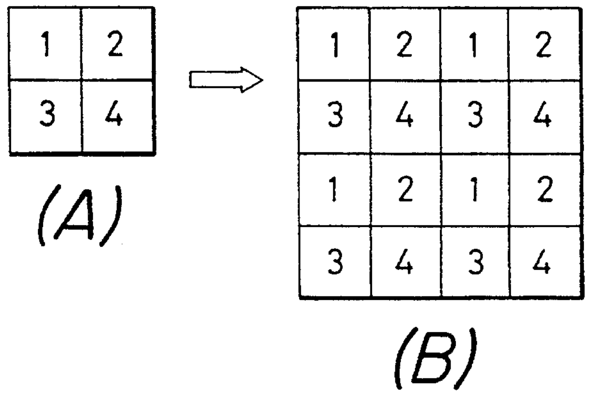
FIGS. 11(A) and 11(B) is a diagram for illustrating a multiplying image.

Such an input image pattern of 2×2 as shown in FIG. 11(A) is projected through a lens array including lenses arranged two-dimensionally simultaneously reproduced into a pattern as shown in FIG. 11(B), the number of 2×2 patterns in the pattern of FIG. 11(B) corresponding to the number of lenses in the array. Examples of such a lens array are fly's eye lens plate, a planar microlens array and a lens array arranged on Fresnels' zone plate which are well-known in the art or are commercially available.

(3) Inverse multiple image formation system

Figure 12:
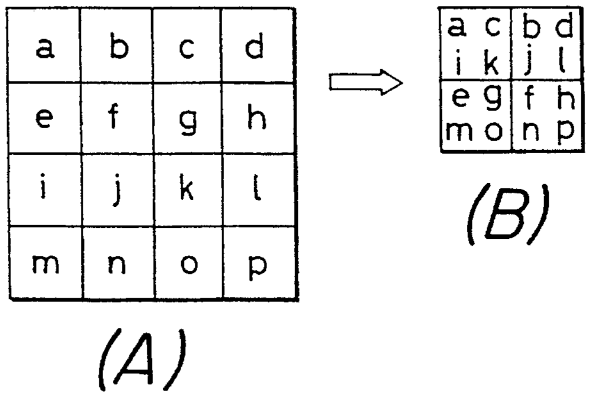
FIGS. 12(A) and 12(B) is a diagram for showing an inverse multiplying system.

Such an input image pattern of 4×4 as shown in FIG. 12(A) is projected, in superposition, into 2×2 image as shown in FIG. 12(B). The projection is actually effected through an optical System using the above described lens array.

A coding method which utilises the aforementioned magnified image, multiplied image and inversely multiplied image to perform coding suitable for two-dimensional data, will be described with reference to an example of a picture image in the form of a 2×2 image. A vector x and a transpose vector x' thereof are expressed as follows.

$$x=\begin{bmatrix} x_1 \\ x_2 \\ x_3 \\ x_4 \end{bmatrix},\ x'=(x_1, x_2, x_3, x_4)$$

The memorizing process is expressed as follows.

$$M = x\cdot x' = \begin{bmatrix} x_1 \\ x_2 \\ x_3 \\ x_4 \end{bmatrix}(x_1, x_2, x_3, x_4) = \begin{bmatrix} x_1x_1 & x_1x_2 & x_1x_3 & x_1x_4 \\ x_2x_1 & x_2x_2 & x_2x_3 & x_2x_4 \\ x_3x_1 & x_3x_2 & x_3x_3 & x_3x_4 \\ x_4x_1 & x_4x_2 & x_4x_3 & x_4x_4 \end{bmatrix}$$

On the other hand, the recalling process is expressed as follows.

$$Z = M\cdot y = \begin{bmatrix} x_1x_1 & x_1x_2 & x_1x_3 & x_1x_4 \\ x_2x_1 & x_2x_2 & x_2x_3 & x_2x_4 \\ x_3x_1 & x_3x_2 & x_3x_3 & x_3x_4 \\ x_4x_1 & x_4x_2 & x_4x_3 & x_4x_4 \end{bmatrix}\begin{bmatrix} y_1 \\ y_2 \\ y_3 \\ y_4 \end{bmatrix} = \begin{bmatrix} x_1x_1y_1+x_1x_2y_2+x_1x_3y_3+x_1x_4y_4 \\ x_2x_1y_1+x_2x_2y_2+x_2x_3y_3+x_2x_4y_4 \\ x_3x_1y_1+x_3x_2y_2+x_3x_3y_3+x_3x_4y_4 \\ x_4x_1y_1+x_4x_2y_2+x_4x_3y_3+x_4x_4y_4 \end{bmatrix}$$

By setting Z' in one dimension to obtain Z, then $$Z=\begin{bmatrix} x_1x_1y_1+x_1x_2y_2+x_1x_3y_3+x_1x_4y_4 \\ x_2x_1y_1+x_2x_2y_2+x_2x_3y_3+x_2x_4y_4 \\ x_3x_1y_1+x_3x_2y_2+x_3x_3y_3+x_3x_4y_4 \\ x_4x_1y_1+x_4x_2y_2+x_4x_3y_3+x_4x_4y_4 \end{bmatrix}$$

However it should be noted that in this method, it is required in picture processing to convert the two-dimensional data of the picture image into one-dimensional data thereof.

According to the present invention, the memorizing process and recalling process are performed as follows.

Assuming that x is the content to be memorized, the x can be expressed as follows.

$$x=\begin{bmatrix} x_1 & x_2 \\ x_3 & x_4 \end{bmatrix}$$

Then, $x_{mag}$ is obtained by the magnified image formations system.

$$x_{mag}=\begin{bmatrix} x_1 & x_1 & x_2 & x_2 \\ x_1 & x_1 & x_2 & x_2 \\ x_3 & x_3 & x_4 & x_4 \\ x_3 & x_3 & x_4 & x_4 \end{bmatrix}$$

$x_{mlt}$ is also obtained by the multiple image formations systems.

$$x_{mlt}=\begin{bmatrix} x_1 & x_2 & x_1 & x_2 \\ x_3 & x_4 & x_3 & x_4 \\ x_1 & x_2 & x_1 & x_2 \\ x_3 & x_4 & x_3 & x_4 \end{bmatrix}$$

Assuming that M is the product between the entries of $x_{mag}$ and $x_{mlt}$, the M is obtained as follows.

$$M = x_{mag}\cdot x_{mlt} = \begin{bmatrix} x_1x_1 & x_1x_2 & x_2x_1 & x_2x_2 \\ x_1x_3 & x_1x_4 & x_2x_3 & x_2x_4 \\ x_3x_1 & x_3x_2 & x_4x_1 & x_4x_2 \\ x_3x_3 & x_3x_4 & x_4x_3 & x_4x_4 \end{bmatrix}$$

("·" denotes mutual multiplication between respective matrix elements, called Hadamard product)

It should be noted that the same result as the one obtained through the aforementioned matrix operation (but different in matrix position) can be obtained, thus memorizing is effected by $x_{mag}\cdot x_{mlt}$.

$$y_{mlt}=\begin{bmatrix} y_1 & y_2 & y_1 & y_2 \\ y_3 & y_4 & y_3 & y_4 \\ y_1 & y_2 & y_1 & y_2 \\ y_3 & y_4 & y_3 & y_4 \end{bmatrix}$$

The product Z' of the matrix elements M and $y_{mlt}$ $Z'=M\cdot y_{mlt}$ is obtained as follows.

$$Z' = M\cdot y_{mlt}$$

$$= \begin{bmatrix} x_1x_1 & x_1x_2 & x_2x_1 & x_2x_2 \\ x_1x_3 & x_1x_4 & x_2x_3 & x_2x_4 \\ x_3x_1 & x_3x_2 & x_4x_1 & x_4x_2 \\ x_3x_3 & x_3x_4 & x_4x_3 & x_4x_4 \end{bmatrix} \begin{bmatrix} y_1 & y_2 & y_1 & y_2 \\ y_3 & y_4 & y_3 & y_4 \\ y_1 & y_2 & y_1 & y_2 \\ y_3 & y_4 & y_3 & y_4 \end{bmatrix}$$

$$= \begin{bmatrix} x_1x_1y_1 & x_1x_2y_2 & x_2x_1y_1 & x_2x_2y_2 \\ x_1x_3y_3 & x_1x_4y_4 & x_2x_3y_3 & x_2x_4y_4 \\ x_3x_1y_1 & x_3x_2y_2 & x_4x_1y_1 & x_4x_2y_2 \\ x_3x_3y_3 & x_3x_4y_4 & x_4x_3y_3 & x_4x_4y_4 \end{bmatrix}$$

An inverse multiplication Z of Z' is expressed as follows.

$$Z = \begin{bmatrix} x_1x_1y_1+x_1x_2y_2+x_1x_3y_3+x_1x_4y_4 & x_2x_1y_1+x_2x_2y_2+x_2x_3y_3+x_2x_4y_4 \\ x_3x_1y_1+x_3x_2y_2+x_3x_3y_3+x_3x_4y_4 & x_4x_1y_1+x_4x_2y_2+x_4x_3y_3+x_4x_4y_4 \end{bmatrix}$$

It should be noted that the'same result as the one obtained through the aforementioned matrix operation (but different in matrix position), can be obtained, and thus the recall pattern can be obtained by inversely multiplied image formation on the basis of $M\cdot y_{mlt}$.

In this manner, the memorizing is effected using the multiplying system and the magnifying system whereas the recalling is effected using the inverse multiplying system thus, associative storage can be effected through only two-dimensional processing.

A specific associative storage according to the present invention will be described as follows. Calculation is performed by the following equation similar to the aforementioned Eq. (3).

$$M_{n+1}=M_n+\alpha(x_{mag}-[\phi\{\Sigma(M_n\cdot x_{mlt})\}]_{mag}\cdot x_{mlt} \quad (4)$$

where Σ means inverse multiple image formations processing, α is a learning gain, $x_{mag}$ is a magnified image of x, and $x_{mlt}$ is a multiplied image of x. The (n+1)th memory matrix $M_{n+1}$ can be obtained by modifying $M_n$ with the product, multiplied by the learning gain α, of $x_{mlt}$ and an error component of recall. The error component is the difference between $x_{mag}$ and $[\phi\{\Sigma(M_n\cdot x_{mlt})\}]_{mag}$, which is resulted from the recalling with $M_n$. As mentioned above, the learning gain α is selected so that the $M_n$ converges. The $M_n$ having an improved separation can be obtained by performing this operational process until the $M_n$ converges.

FIG. 1 is a block diagram showing an arrangement of an associative memory according to the present invention, in which reference, numeral 101 designates a magnifying system; 102, a multiplying system; 103, a first operational device; 104, a memory; 105, a second operational device; 106, an inversely multiplying system; and 107, a threshold memory.

In FIG. 1, the magnifying system 101, as described above, produces $x_{mag}$ in the form of 16×16 matrix from an input x of 4×4 matrix, for example, and similarly the multiplying system 102 produces $x_{mlt}$ in the form of 16×16 matrix from the input x of 4×4. The first operational device 103 produces the product of, the respective matrix elements of $x_{mag}$ and $x_{mlt}$. The first memory 104 performs addition of $x_{mag}$ and $x_{mlt}$, and subtraction of a value of feedback. The second operational device 105 produces recall data by performing multiplication of the output of the memory 104 and the $x_{mlt}$.

The inversely multiplying system 106 is for converting data in the form of 16×16 matrix into data in the form of 4×4. The threshold memory 107 is to perform thresholding operation for detecting the data having a level higher than a predetermined level to eliminate noise portion of the data. The output y of the threshold memory 107 is fed back to the input terminal through a feedback loop.

The memorizing processing according to the Eq. (4) will now be described as follows. The thin lines in FIG. 1 show the flow of signals in the memorizing processing.

(1) $x_{mag}$ is produced on the basis of the two-dimensional input x to be memorized in the magnifying system 101 while at the same time $x_{mlt}$ is produced in the multiplying system 102.

(2) $M_n\cdot x_{mlt}$ is calculated in the second operational device 105 on the basis of $M_n$ from the memory 104 and $x_{mlt}$ from the multiplying system 102 and then is subjected to thresholding operation at the threshold memory 107 via the inversely multiplying system 106. It should be noted that an initial value of the $M_n$ is set to "0".

(3) The $x_{mag}$ and $x_{mlt}$ thus produced are input to the first operational device 103, in which the multiplication of $x_{mag}\cdot x_{mlt}$ is performed. The $x_{mag}\cdot x_{mlt}$ is multiplied by α and is then added to $M_n$ stored in the memory 104. The addition result is $M_{n+}1$.

(4) The result of the step (2) is fed back to the input terminal via the feedback loop, and is magnified in the magnifying system 101 to produce $[\phi\{\Sigma(M_n\cdot x_{mlt})\}]_{mag}$.

(5) $[\phi\{\Sigma(M_n\cdot x_{mlt})\}]_{mag}\cdot x_{mlt}$ is calculated in the first operational device 103 and then is multiplied by α to be subtracted from $M_n$.

Repeating the aforementioned operation till $M_n$ converges for each of input patterns permits the memorizing processing of the input data. If desired $M_n$ has been obtained, the processing is allowed to start based on the desired $M_n$.

The operation in recalling will now be described with reference to an Eq. (5).

$$y=\phi\{\Sigma(M_n\cdot x_{mlt})\} \quad (5)$$

It is assumed that memory matrix M has been calculated and memorized. The thick lines in FIG. 1 show a flow of signals in the recalling processing according to the Eq. (5).

(1) $X_{mlt}$ is first produced in the multiplying system 102 on the basis of the input data x to be recalled.

(2) The second operational device 105 performs multiplication of the $x_{mlt}$ and M from the memory 104, the result of which is inversely multiplied by the inversely multiplying system 106. Then, the output of the inversely multiplying system 106 is stored in the threshold memory after thresholding operation thereof.

(3) The data is read out from the threshold memory 107, and if the one time recalling does not provide enough quality of data, then the output is fed back to the input terminal to recall again for a desired quality of data readout.

In this manner, the memorizing and recalling processings are effected.

Figure 2:
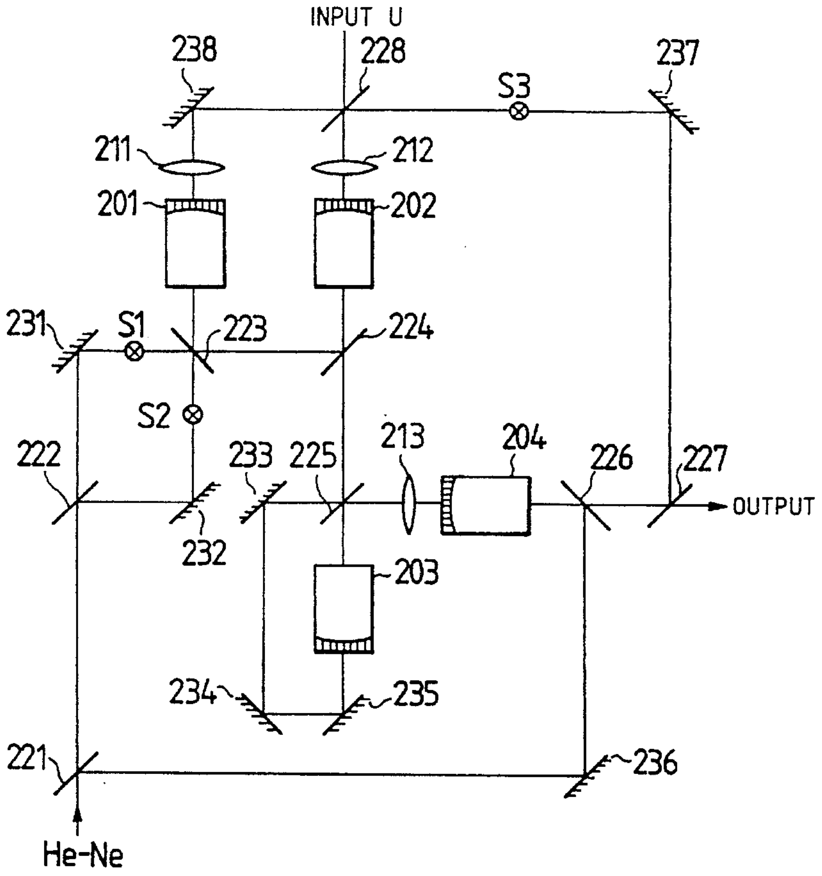
FIGS. 2, 3, 4, and 5 are diagrams showing embodiments of the optical systems of an associative memory according to the invention using spatial light modulation tubes.

The associative memory shown in FIG. 1, embodied using spatial light modulation tubes, will now be described as follows. FIG. 2 is a diagram for showing just embodiment using a complete optical system utilising four spatial light modulation tubes. In FIG. 2, reference numerals 201 to 204 denote spatial light modulation tubes; 211, a magnified image formation system; 212, a multiple image formation system; 213, an inverse multiple image formation system; 221 to 228, half mirrors; 231 to 238, reflectors and S1, S2, S3, shutters.

These devices are arranged to act as the corresponding device in FIG. 1. That is, the operational devices 103 and 105 are implemented by reading the data from the spatial light modulation tube 201 to the spatial light modulation tube 202. The spatial light modulation tube 203 is arranged to act as the memory 104 and the spatial light modulation tube 204 is arranged to act as the memory 107. Calculation is performed in accordance with the Eq. (4), as in the case of FIG. 1.

Figure 2A:
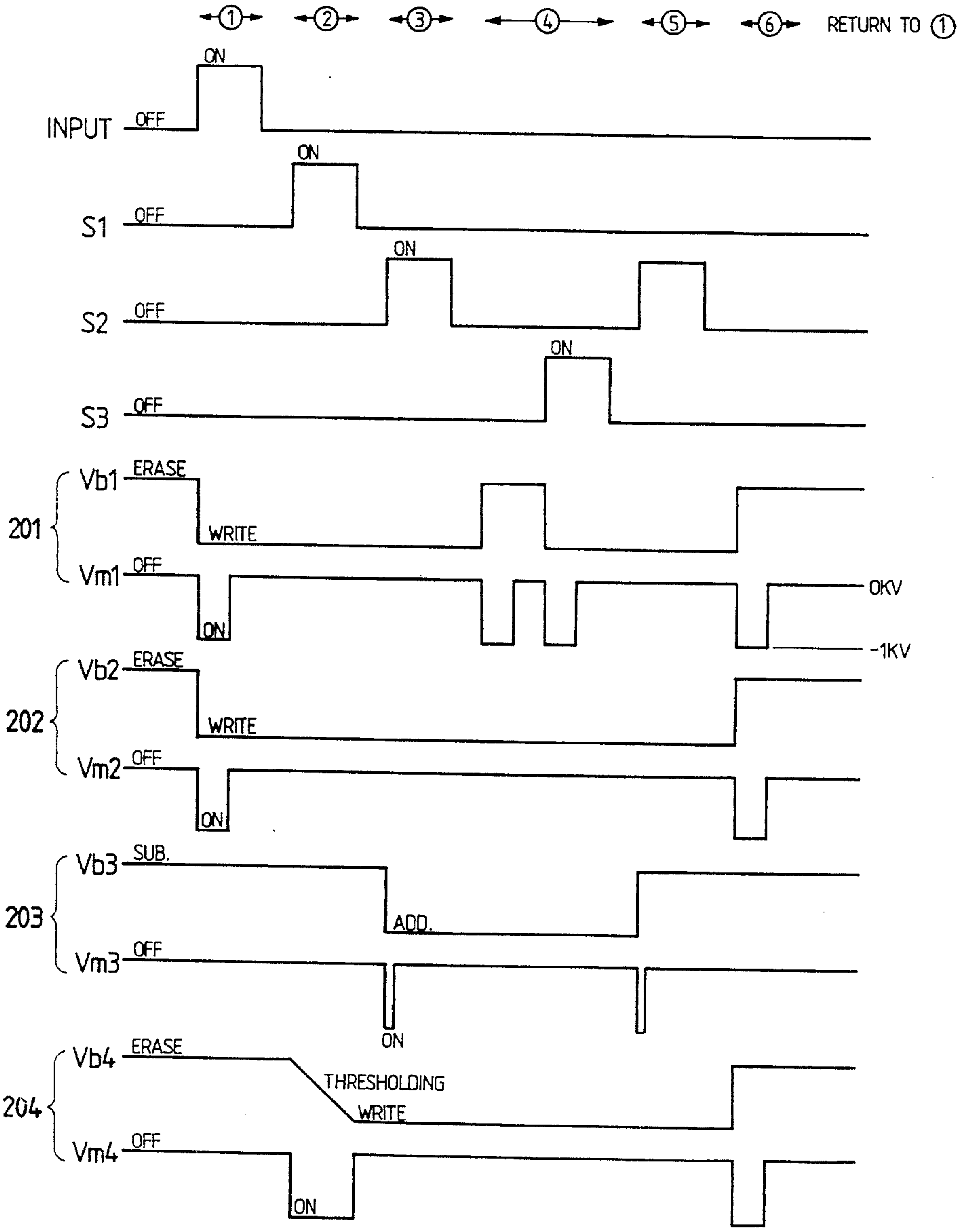

FIG. 2(A) is a timing chart showing the memorizing process of the device of FIG. 2.

(1) An input U is supplied to the magnifying image formation system 211 and to the multiple image formation system 212 via the half mirror 228 and the reflector 238 respectively to produce $U_{mag}$ and $U_{mlt}$, which are stored into the spatial light modulation tubes 201 and 202.

(2) The shutter S1 is opened for reading the data from the spatial light modulation tube 202 to the tube 203 by means of a monochromatic light via the half mirrors 221, 222, the reflector 231, and the half mirrors 223, 224 to calculate $M_n \cdot U_{mlt}$. The calculated result is written into the spatial light modulation tube 204 via the half mirror 225 and the inverse multiple image formation system 213, while being threshold-operated through real time thresholding operation of the tubes 204.

(3) The shutter S2 is opened for reading out the data from the light modulation tube 201 to the tube 202 by means of a monochromatic light via the reflector 232 and the half mirrors 223, 224 to calculate $U_{mag} \cdot U_{mlt}$. Then the calculated result is added to the spatial light modulation tube 203 via the half mirror 225 and the reflectors 233, 234, 235.

(4) The shutter S3 is opened, after erasing the spatial light modulation tube 201, to read out the data from the spatial light modulation tube 204 by means of a monochromatic light through the half mirror 221, the reflector 236 and the half mirror 226. The data is then supplied to the magnified image formation system 211 to be magnified via the half mirror 227, and the reflectors 237 and 238. The $(M_n \cdot U_{mlt})_{mag}$ is written into the spatial light modulation tube 201.

(5) The shutter S2 is opened to read the data from the spatial light modulation tube 201 to the tube 202, and $[\phi\{\Sigma(M_n \cdot U_{mlt})\}]_{mag} \cdot U_{mlt}$ is then calculated to be subtracted from the spatial light modulation tube 203. At this time, the result will not be below zero by virtue of the effect of a mesh electrode.

(6) The spatial light modulation tubes 201, 202 and 204n are erased.

Repeating the above operation till respective input patterns converge, completes memorization. In FIG. 2(A), the above processings (1) to (6) are designated by the same reference numerals (1) to (6).

Figure 2B:
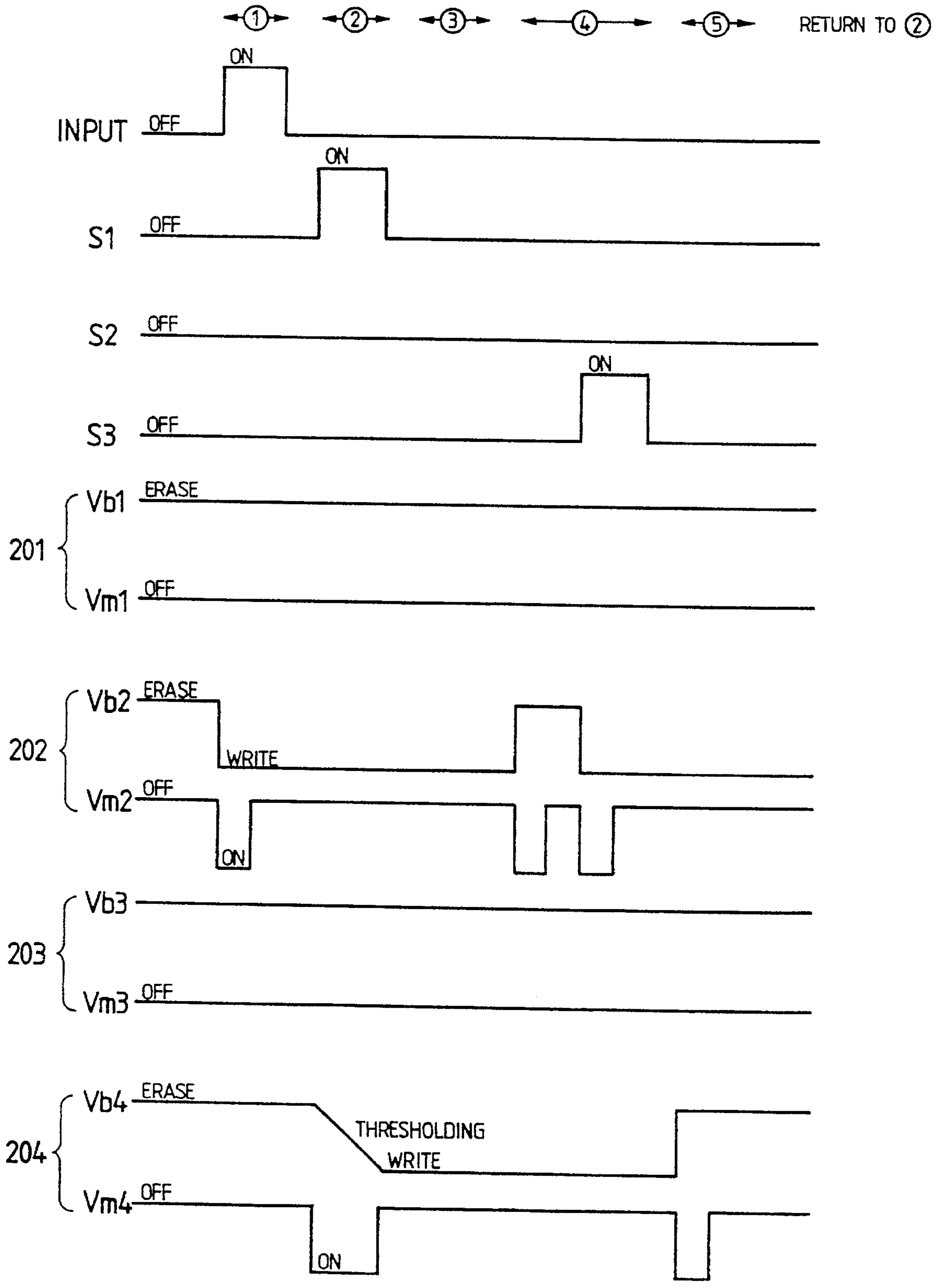

Operation in the recalling processing will now be described with reference to FIGS. 2 and 2(B). FIG. 2(B) is a timing chart for the recalling processing, in which the following processings (1) to (5) are designated by the same reference numerals (1) to (5).

(1) The input U is supplied to the spatial light modulation tube 202 via the half mirror 228 and the multiple image formation system 212 to write $U_{mlt}$ into the spatial light modulation tube 202.

(2) The shutter S1 is opened for reading the data from the spatial light modulation tube 202 to the spatial light modulation tube 203 to calculate $M_n \cdot U_{mlt}$. The result of the calculation is written through the inverse multiple image formations system 213 into the spatial light modulation tube 204 while at the- same time the result is real time threshold-operated thereat.

(3) The data is read out from the spatial light modulation tube 204 via the half mirror 227.

It is also possible to recall again by opening the shutter S3 and then feeding back the output of the half mirror 227.

(4) After erasing the Spatial light modulation tube 202, the shutter S3 is opened so that the input from the feed back loop through the half mirror 227 and the reflector 237 is written into the spatial light modulation tube 202 as $U_{mlt}$ through the half mirror 228 and the multiple image formation system 212.

(5) After erasing the spatial light modulation tube 204, the processing is allowed to return to the processing (2).

Figure 3:
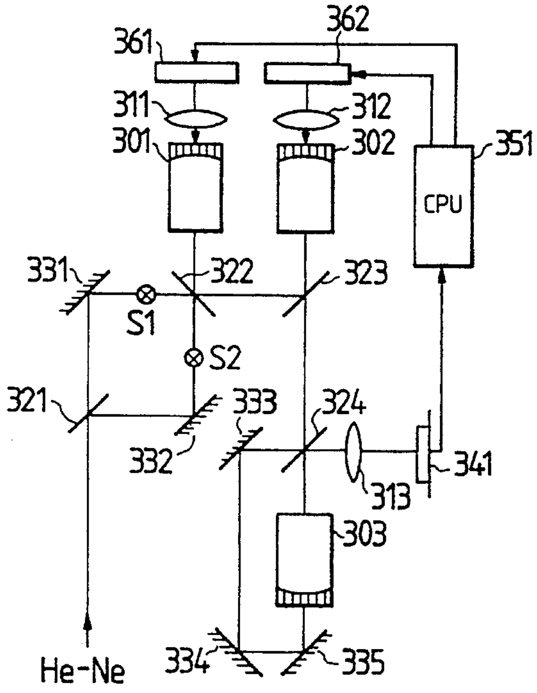

FIG. 3 is a diagram for showing a second embodiment of a hybrid associative memory according to the present inventions, in which a complete optical system shown in FIG. 2 is partially replaced by an electronic circuit. In FIG. 3, reference numerals 301 to 303 denote spatial light modulation tubes; 311, a magnified image formation system; 312, a multiple image formation system; 313, an inverse multiple image formation system; 321 to 324, half mirrors; 331 to 335, reflectors; 341, a light receiving matrix; 351, a CPU; 361 and 362, pattern display devices, and S1 and S2, shutters.

In the embodiment, the input port and the feedback loop is advantageously replaced by the CPU for easy interface between electronic circuits. Also only three spatial light modulation tubes are used resulting in simplification of the system.

Figure 3A:
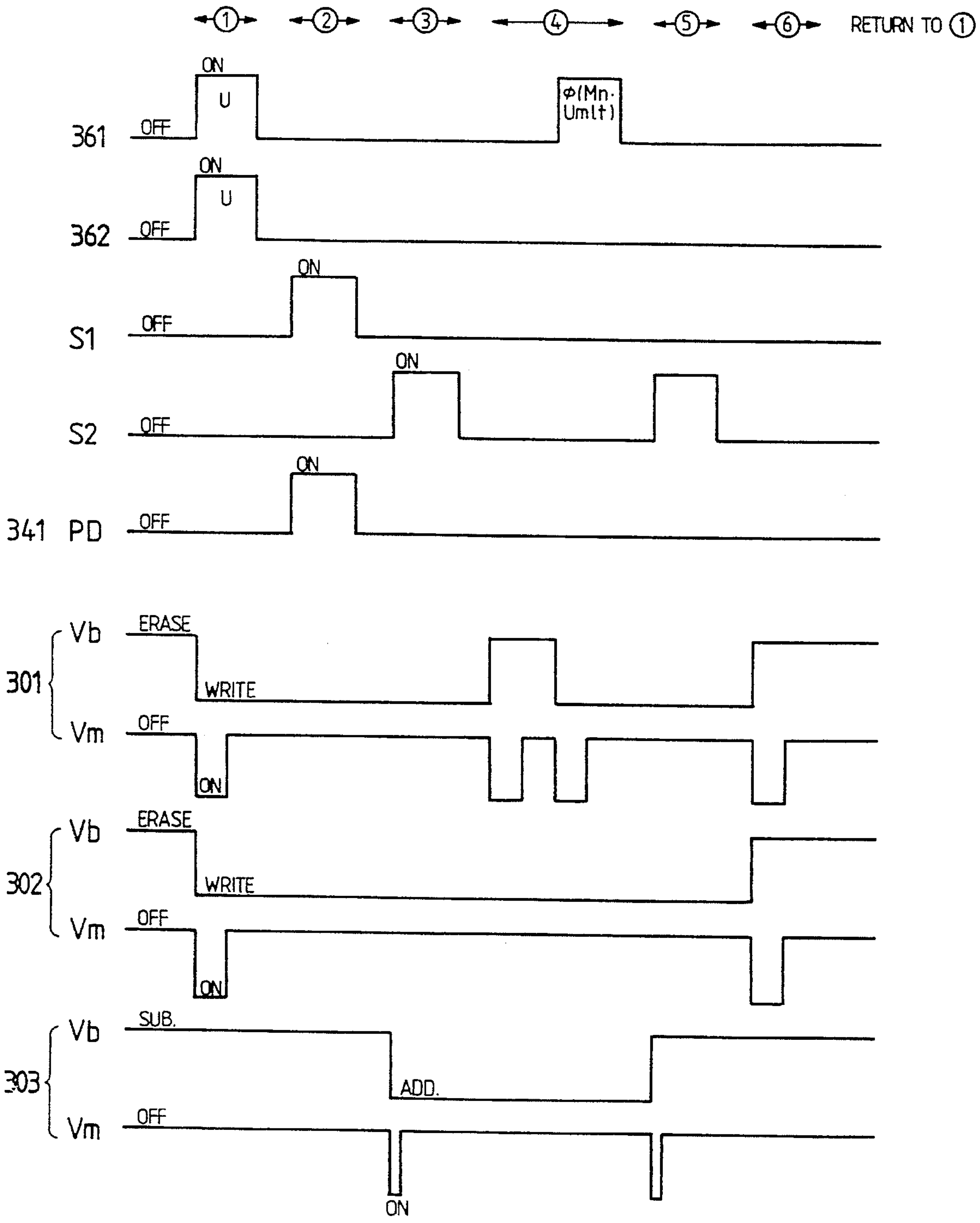

The memorizing processing of the second embodiment will be described with reference to FIG. 3(A) showing a timing chart therefor. In FIG. 3(A), the following memorizing processings (1) to (6) are designated by the same reference numerals (1) to (6).

(1) An input U is applied to a pattern display device 361 to be displayed therein. The displayed pattern is magnified by the image formation system 311 to produce $U_{mag}$. The $U_{mag}$ is then applied to the spatial light modulation tube 301 to be stored therein. Similarly, the input U is also applied to the pattern display device 362 and $U_{mlt}$ is obtained by the multiple image formation system 312. Subsequently, the $U_{mlt}$ is applied to the spatial light modulation tube 302 to be stored therein.

(2) After opening the shutter S1, the data is read out from the tube 302 through the mirrors 321, 331 and 323. Further, the data is read out from the tube 303 through the mirror 324 to calculate $M_n \cdot U_{mlt}$. The calculated data $M_n \cdot U_{mlt}$ is subjected to inverse multiple image formation in the system 313 and then is converted to an electric'signal in the light receiving matrix to be applied to the CPU 351. After thresholding, $\phi\{\Sigma(M_n \cdot U_{mlt})\}$ is obtained.

(3) After opening the shutter S2, the data is read out from the tube 301 through the mirrors 321, 332 and 322. In succession, the data is read out from the tube 302 through the mirror 323 to calculate $U_{mag} \cdot U_{mlt}$. The calculated data is applied to the tube 303 through the mirrors 324 333, 334 and 335.

(4) After erasing the tube 301, the data $\phi\{\Sigma(M_n \cdot U_{mlt})\}$ is displayed by the device 361 and $[\phi\{\Sigma(M_n \cdot U_{mlt})\}_{mag}$ is written through the system 311 to the tube 301.

(5) After opening the shutter S2, the data stored in the tubes 301 and 302 are read out in succession to calculate $\equiv\phi\{\Sigma(M_n \cdot U_{mlt})_{mag} \cdot U_{mlt}$ to be subtracted from the data stored in the tube 303. In this case, the calculation result is not made lower than "0" due to the mesh-effect.

(6) The spatial light modulation tubes 301 and 302 are erased.

The above (1) to (6) are repeatedly carried out to complete the memorization.

Figure 3B:
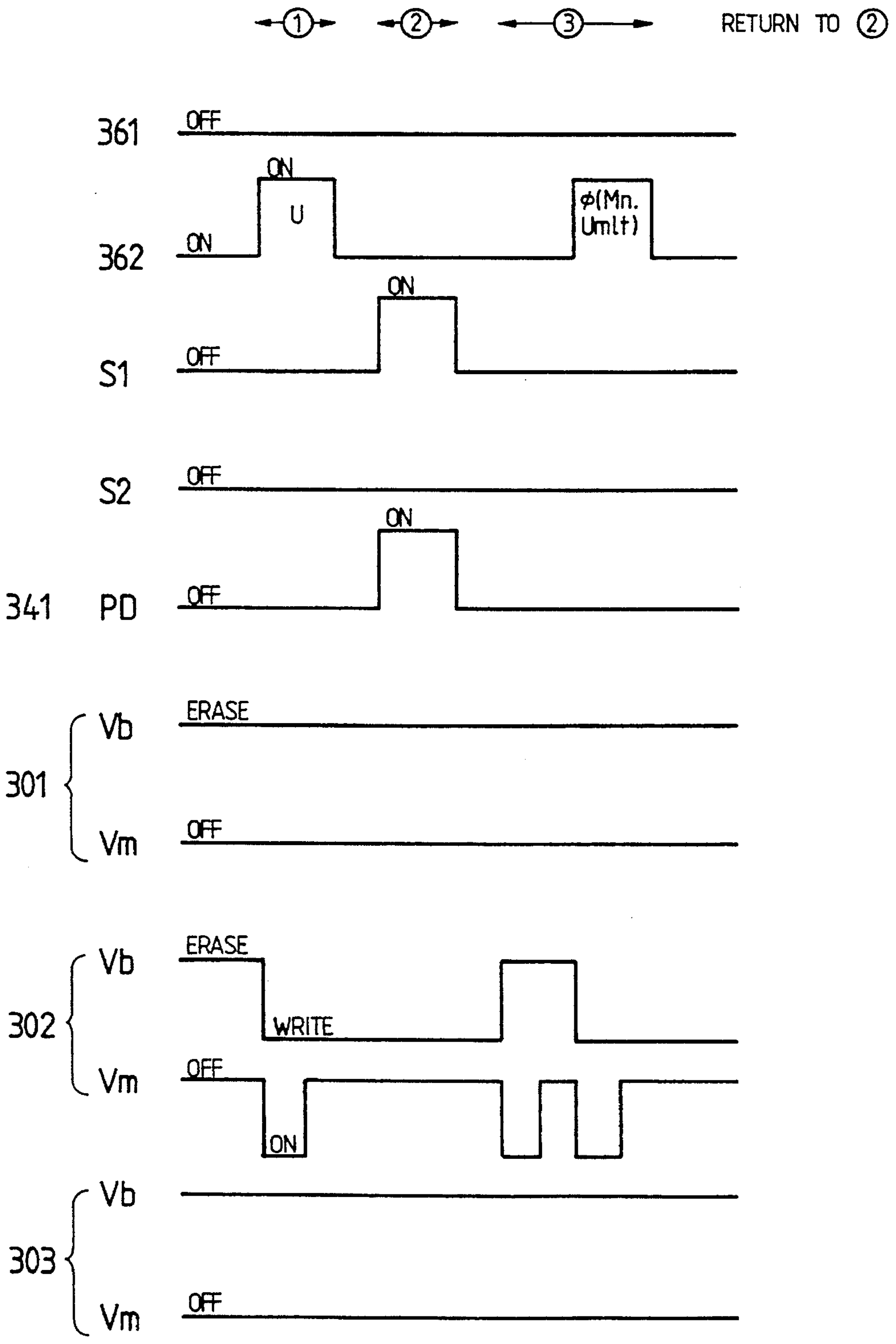

Next, the recalling processing of the second embodiment will be described with reference to FIG. 3(B) which is a timing chart therefor.

(1) An input U which is supplied via CPU 351 is displayed in the device 362 and is written through the multiple image formation system 312 to the tube 302.

(2) After opening the shutter S1, the data stored in the tubes 302 and 303 are read out in succession to calculate $M_n \cdot U_{mlt}$. The calculated data is applied through the system 313 to the light receiving matrix 341 to be converted to an electric signal. The electric signal is applied to the CPU 351. After thresholding, an output of $\phi\{\Sigma(M_n \cdot U_{mlt})\}$ is obtained. It is also possible to carry out the recalling processing again by feeding this output to the input side.

(3) After erasing the tube 302, $\phi\{\Sigma(M_n \cdot U_{mlt})\}$ is displayed in the device 362 to be written through the system 312 to the tube 302. The processing is then returned to the processing (2).

In the aforementioned two embodiments, the system performs multiplication in the spatial light modulation tubes 201, 202, and 301, 302, respectively, and this multiplication is the same as the ANDed operation as in a logical operation since the operation is actually two-value multiplication (0 and 1). Thus, it should be noted that replacing this multiplication by an AND operation, which performs real time threshold-operation, can reduce the number of the spatial light modulation tubes by one.

Figure 4:
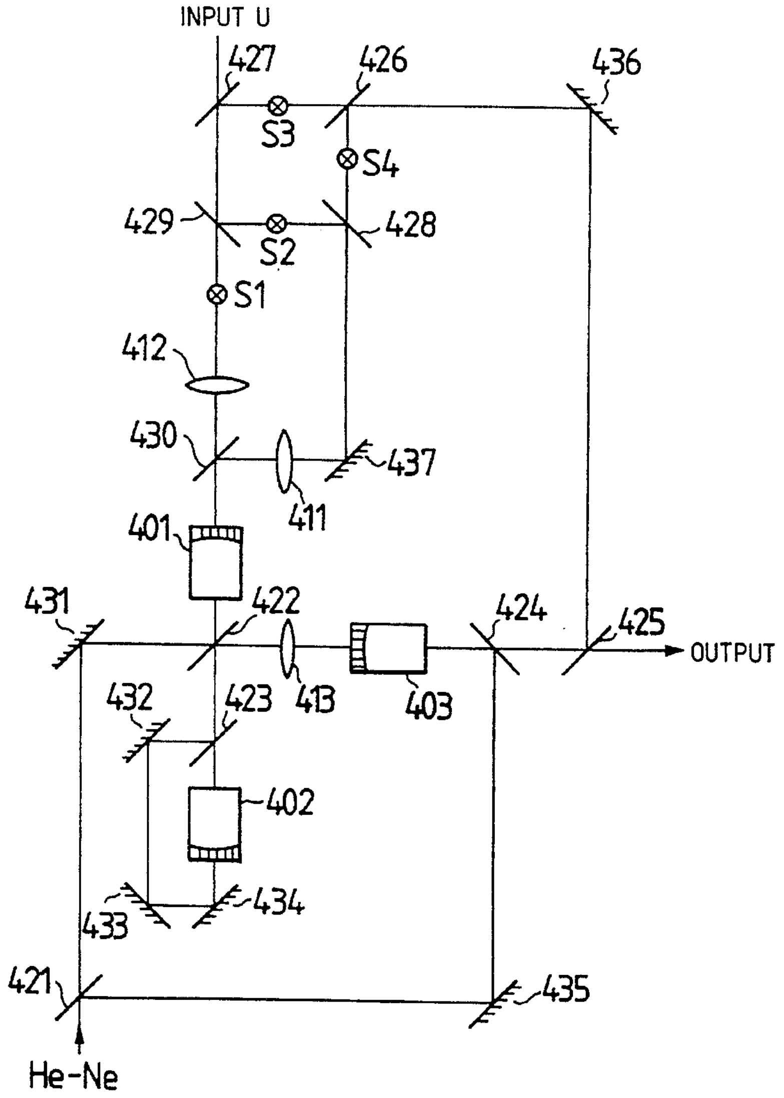

FIG. 4 shows a third embodiment of an associative memory arranged with a complete optical system in which the number of spatial light modulation tubes is reduced to three from four by employing an ANDed operation which performs real time thresholding operation. In FIG. 4, reference numerals 401 to 403 denote spatial light modulation tubes; 411, a magnified image formation system; 412, a multiple image formation system; 413, an inverse multiple image formation system; 421 to 430, half mirrors; 431 to 437, reflectors; and S1, S2, S3, S4, shutters. In FIG. 4, the spatial light modulation tube 401 performs an ANDed operation, the spatial light modulation tube 402 functions as a memory and the spatial light modulation tube 403 functions as a threshold memory.

Figure 4A:
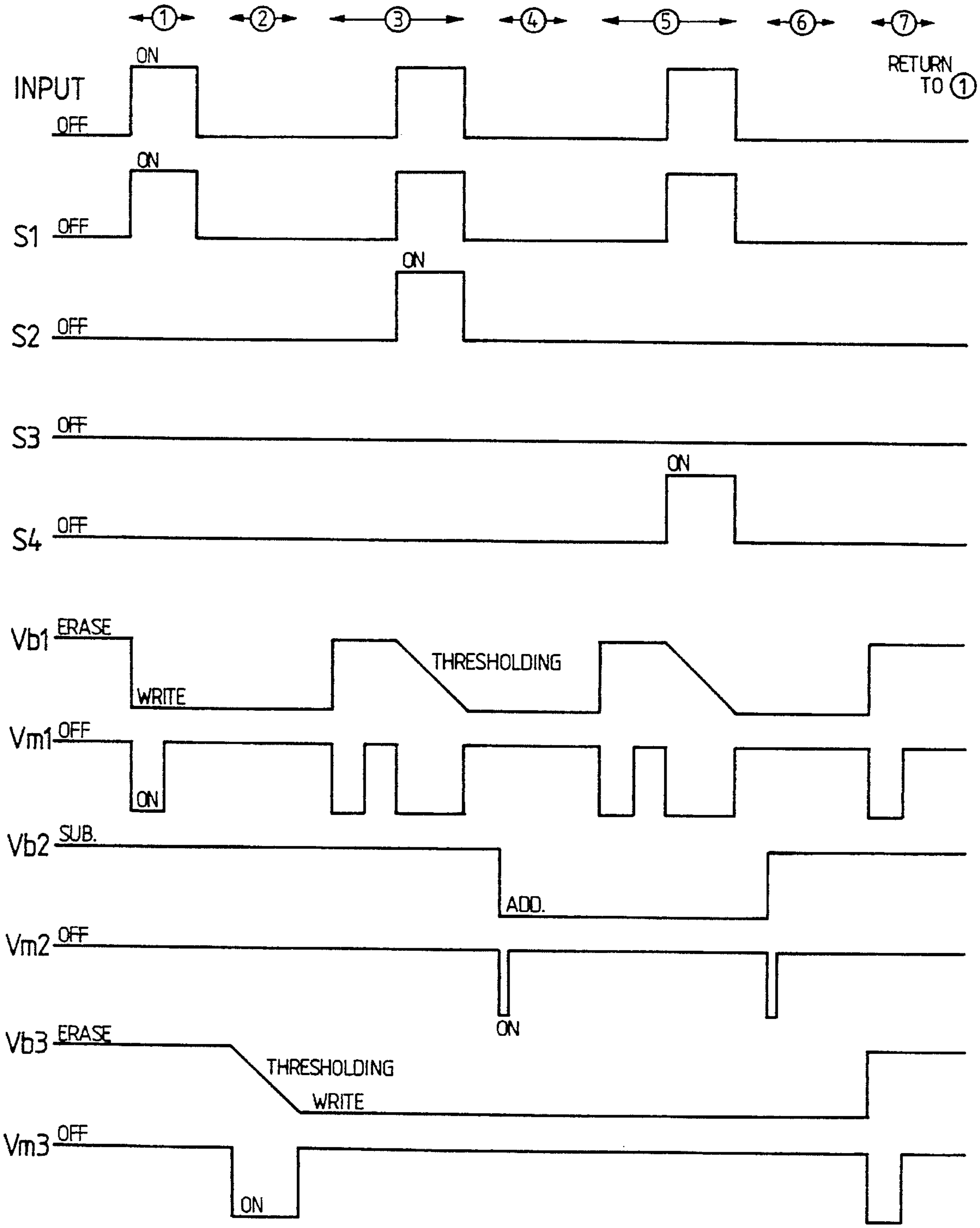

Memorizing processing will be described with reference to FIG. 4(A) showing a timing chart therefor in which the following processings are designated by the same reference numerals.

(1) The shutter S1 is opened to input an input signal U, and the multiple image of the input signal U is formed as $U_{mlt}$ in the multiple image formation system 412 to write The $U_{mlt}$ is written into the spatial light modulation tube 401.

(2) The data is read from the spatial light modulation tubes 401 to 402 to calculate $M_n \cdot U_{mlt}$, and then the data is written via the inverse multiple image formation system 413 into the spatial light modulation tube 403 while at the same time the data is subjected to real time thresholding operation at the spatial light modulation tube 403.

(3) The shutters S1 and S2 are opened, after the spatial light modulation tube 401 is erased, to produce a multiplied image and a magnified image. The images are ANDed through real time thresholding operation of the spatial light modulation tube 401.

(4) The data $U_{mag} \cdot U_{mlt}$ is read from the spatial light modulation tube 401 and is added to the content of the spatial light modulation tube 402.

(5) The shutters S1 and S4 are opened, after the spatial light modulation tube 401 is erased, to perform ANDed operation of $[\phi\{\Sigma(M_n \cdot U_{mlt})\}]_{mag}$ and $U_{mlt}$ through real time thresholding operation of the spatial light modulation tube 401.

(6) The data is read from the spatial light modulation tube 401 to subtract it from the content of the spatial light modulation tube 402. At this time the result will not be less than zero due to the effect of the mesh electrode.

(7) The spatial light modulation tubes 401 and are erased.

Repeating the aforementioned operation till respective patterns converge, will complete the memorizing.

Figure 4B:
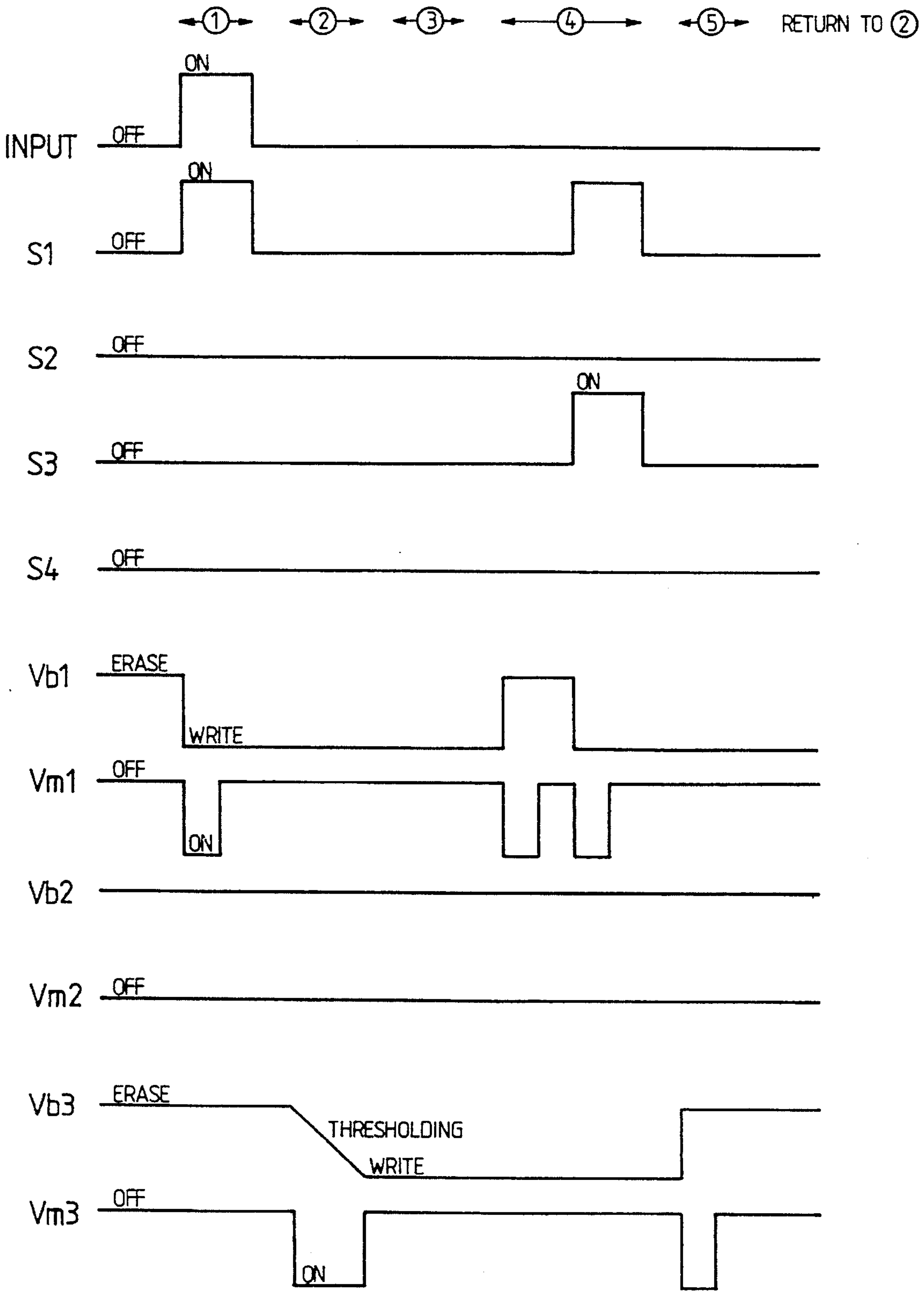

The recalling processing will now be described with reference to FIG. 4(B) showing a timing chart therefor, where the following processings (1) to (5) are designated by the same reference numerals (1) to (5).

(1) The shutter S1 is opened to write the multiple image formation $U_{mlt}$ into the spatial light modulation tube 401.

(2) The data is read from the spatial light modulation tube 401 to the spatial light modulation tube to calculate $M_n \cdot U_{mlt}$, and the result of the calculation is written into the spatial light modulation tube 403 via the inverse multiple image formation system while at the same time subjecting the data to real time thresholding at the spatial light modulation tube 403.

(3) The data is read from the spatial light modulation tube 403 through the half mirror 425.

It is possible to recall again by opening the shutter S1 and S3 for feeding back this data.

(4) After erasing the spatial light modulation tube 401, the shutters S1 and S3 are opened to write the output of a feed back loop through the multiple image formation system to the spatial light modulation tube 401.

(5) After erasing the spatial light modulation tube 403, the processings from the (2) are repeated.

Figure 5:
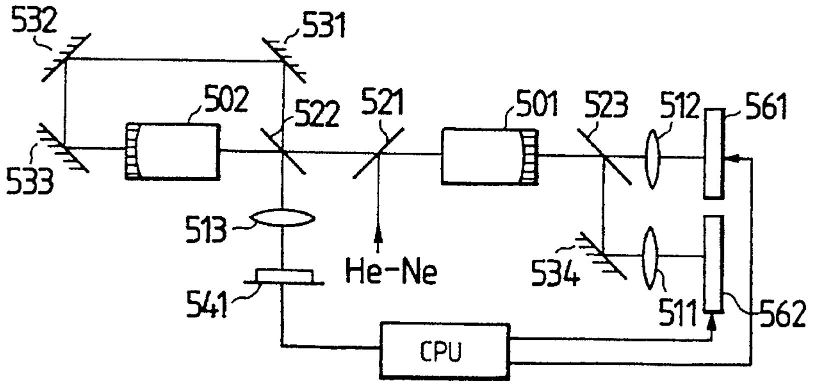

FIG. 5 shows a fourth embodiment of a hybrid associative memory according to the present invention, in which a complete optical system shown in FIG. 4 is partially replaced by electronic circuits.

In FIG. 5, reference numerals 501 and 502 denote spatial light modulation tubes; 511, a magnified image formation system; 512, a multiple image formation system; 513, an inverse multiple image formation system; 521 to 523, half mirrors; 531 to 534, reflectors,; 541, a light receiving matrix; 551, a CPU and 561 and 562, pattern display devices.

This embodiment provides an easy interface with the electronic circuits since the input portion and the feedback portion of the associative memory system in FIG. 4 are replaced by the CPU. Also replacing the output portion by electronic circuits can provide a hybrid associative memory with one less number of spatial light modulation tubes.

Figure 5A:
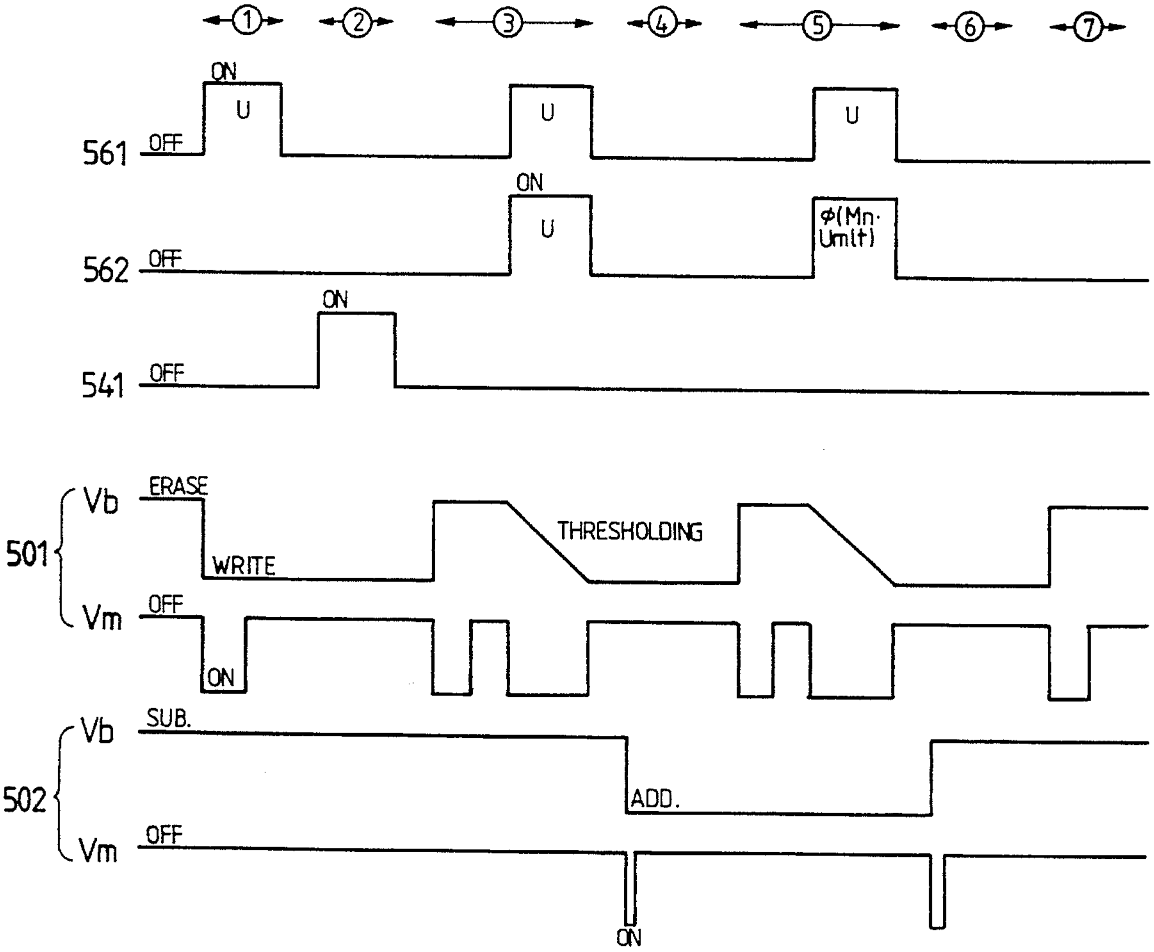

In the above fourth embodiment of the present invention, the memorizing processings will be described with reference to FIG. 5(A) showing a timing chart therefor, in which the following processing steps (1) to (7) are designated by the same reference numerals (1) to (7).

(1) An input U is displayed in the pattern display device 561 and the displayed data is written through the multiple image formation system 512 to the spatial light modulation tube 501 as $U_{mlt}$.

(2) The data are read out from the tubes 501 and 502 successively to calculate $M_n \cdot U_{mlt}$. The calculated data is applied through the inverse multiple image formation system 513 to the light receiving matrix 541 to be converted into an electric signal. The electric signal is applied to the CPU, and after thresholding, the data $\phi\{\Sigma(M_n \cdot U_{mlt})\}$ is obtained.

(3) After erasing the tube 501, the $U_{mlt}$ and $U_{mag}$ are applied to the tube 501 through the device 561 and the mirror 523, and the device 562 and the mirror 534, respectively, so as to be subjected to real time thresholding. In the tube 501, an ANDed operation of the $U_{mag}$ and $U_{mlt}$ are carried out.

(4) The data is read out from the tube 501 to be added to the data stored in the tube 502.

(5) After erasing the tube 501, the U and $\phi\{\Sigma(M_n \cdot U_n \cdot U_{mlt})\}$ are displayed by the device 561 and 562, respectively, to be applied through the optical systems 512 and 511 to the tube 501. In the tube 501, an ANDed operation therefor is carried out by the real time thresholding operation.

The data is read out from the tube 501 to be subtracted from the data stored in the tube 502. In this case, the result is made not less than zero due to the the effect of the mesh electrode.

(7) The spatial light modification tube 501 is erased.

Figure 5B:
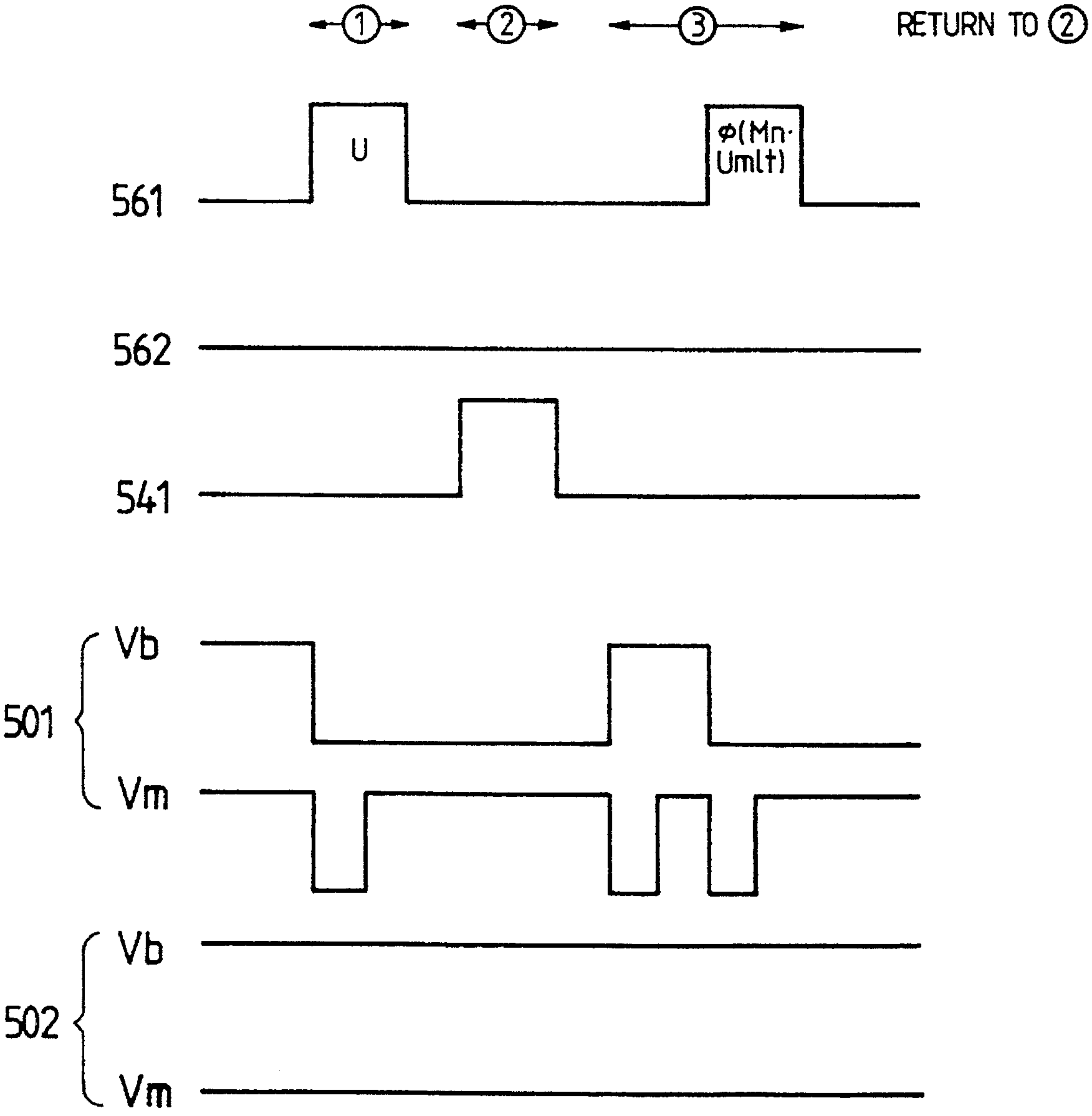

Next, the recalling processings will be described with reference to FIG. 5(B) showing a timing chart therefor, in which the following steps (1) to (3) are designated by the same reference numerals (1) to (3).

(1) The input U is displayed in the device 561 and the $U_{mlt}$ which is obtained by the system 512 is written to the tube 501.

(2) The data in the tubes 501 and 502 are read out to calculate $M_n \cdot U_{mlt}$. The thus obtained $M_n \cdot U_{mlt}$ is subjected to the inverse multiple image formation in the system 513 and then is converted into an electric signal in the light receiving element matrix 541 to be applied to the CPU. After thresholding, the output of $\phi\{\Sigma(M_n \cdot U_{mlt})\}$ is obtained. This output may be fed back to the input port to carry out the recalling processing again.

(3) After erasing the tube 501, the output of $\phi\{\Sigma(M_n \cdot U_{mlt})\}$ is displayed in the device 561 and the output of $\phi\{\Sigma(M_n \cdot U_{mlt})\}$ is written to the tube 501. Thereafter, the processing step is returned to the step (2).

The discussion is made on a fundamental arrangement of the invention embodied by a complete optical system and by combination of an optical system and electrical system. Of course, modifications may be made to the embodiment disclosed, for example by arranging a complete electrical circuit system in which the entire system is constructed with electrical systems.

According to the present invention, the associative memory operates in such a way that memory content is searched for the same portions of an information as a reference input from outside or for portions of an information coincident with a certain condition, and then the rest of the information is recovered. Thus it will not be totally impossible to read the data content even when a portion of the data content has been destroyed. Also accessing in association with the stored content can be advantageously applied to an information retrieval or the like. Unlike memory devices for computers such as conventional associative memories that are intended for electrical digital signals, the optical associative memory according to the invention as described, does not require a scan operation for pattern information and can replace the usual electrical processing by optical ones. Thus, the present invention reduces significantly the process time required and permits successive outputs. Consequently, applications in the field of optical retrieval devices are made possible.

What is claimed is:

1. An associative memory comprising:

a reproducing system for simultaneously reproducing a multiplicity of an input signal or a feedback signal;

a two-dimensional magnifying system for two-dimensionally magnifying said input signal or said feedback signal a first operational device for producing a first signal representing a product of the output of said reproducing system and the output of said two-dimensional magnifying system;

a memory means for storing two-dimensional information and for outputting the content thereof as required;

a second operational device for producing a product of the output of said memory means and the output of said reproducing system;

an inversely multiplying system for inversely multiplying the output from said second operational device;

a threshold memory for storing, while thresholding, the output from said inversely multiplying system, and for outputting the content thereof as required; and a feedback loop for feeding back the output of said threshold memory as said feedback signal.

2. The associative memory of claim 1, wherein said reproducing system, said memory means, said second operational device, said inversely multiplying system, said threshold memory and said feed back loop constitute a recall unit.

3. The associative memory of claim 1, wherein said memory means operate to subject the information to addition and subtraction operations.

4. The associative memory of claim 2, wherein said reproducing system is a multiple image formation system for producing a multiple image of said input signal or said feed back signal; said two-dimensional magnifying system is a two-dimensionally magnified image formation system for producing a two-dimensional magnified image of said input signal or said fee back signal; said memory means is an optical memory means for storing two-dimensional optical information;and said inversely multiplying system is an inverse multiple image formation system for subjecting the output of said second operational device to the inverse multiple image formation.

5. The associative memory of claim 3, wherein said reproducing system, said memory means, said second operational device, said inversely multiplying system, said threshold memory and said feed back loop constitute a memorize unit.

6. The associative memory of claim 2, wherein said reproducing system, said magnifying system, said first operational device, said memory means, said second operational device, said inversely multiplying system, said threshold memory and said feed back loop constitute a recall/memorize unit.

7. An optical associative memory comprising:

a multiple image formation system for forming a multiple image of an input signal or a feed back signal on a photocathode of a first spatial light modulation tube;

a magnified image formation system for forming a magnified image of the input signal or the feed back signal on photocathode of a second spatial light modulation tube;

an image formation system for forming either an output of said second spatial light modulation tube or a product of outputs of said first and second spatial light modulation tubes on a photocathode of a third spatial light modulation tube, said product thereof being obtained by a multiplying operation where the data stored in said first and second spatial light modulation tubes are read out successively;

an inverse multiple image formation system for forming an inverse multiple image of a product of outputs of said second and third spatial light modulation tubes on a photocathode of a fourth spatial light modulation tube, said product being obtained by a multiplying operation where the data stored in said second and third spatial light modulation tubes are read out successively, and said fourth spatial light modulation tube performs thresholding on the product of outputs of said second and third spatial light modulation tubes to be stored therein;

an optical means for reading out the data stored in said fourth optical light modulation tube; and a feed back optical loop for feeding-back the output of said optical means as the feed back signal.

8. An optical associative memory comprising:

a first image formation system for reproducing one of an input signal and a feedback signal to simultaneously form a multiplicity of images of the reproduced one of the input signal and the feedback signal on a photocathode of a first spatial light modulation tube;

a second image formation system for forming a two-dimensionally magnified image of the input signal or the feedback signal on a photocathode of a second spatial light modulation tube;

said first spatial light modulation tube also being for producing either an output representing logical product of outputs of said first and second image formation systems or one of the outputs of said first and second image formation systems;

a third image formation system for forming an image of the output of said first light modulation tube on the photocathode of the second spatial light modulation tube;

an inverse multiple image formation system for forming an inverse multiple image of a product of outputs of said first and second spatial light modulation tubes on a photocathode of a third spatial light modulation tube, said third light modulation tube subjecting the inverse multiple image to thresholding and storage therein;

an optical means for reading out the data stored in said third spatial light modulation tube; and a feedback optical loop for feeding-back the output of said optical means as the feedback signal.

9. An optical associative memory comprising:

an optical system for displaying an input signal or a signal;

a first image formation system for forming a two-dimensionally magnified image of the output of said optical system on a photocathode of a first light modulation tube;

a second image formation system for reproducing one of the input signal and the feedback signal to simultaneously form a multiplicity of images of the reproduced one of the input signal and the feedback signal on the photoelectric surface of said first light modulation tube, said first light logical product of the outputs of said first and second image formation systems or one of the outputs of said first and second image formation systems;

a third image formation system for forming an image of the output of said first light modulation tube on a photocathode of a second light modulation tube;

an inverse multiple image formation system for forming an inverse multiple image of the output of said second spatial light modulation tube on a light receiving means; and a data processing means for subjecting the output of said light receiving means to thresholding and for processing the input signal and the feedback signal.

10. An associative memory comprising:

an optical system for displaying an input signal or a feed back signal;

a first image formation system for forming magnified image of the output of said optical system on a photocathode of a first light modulation tube;

a second image formation system for forming a multiple image of the output of said optical system on a photoelectric surface of a second light modulation tube;

an image formation system for forming an image of either an output of said second spatial light modulation tube or a product of outputs of said first and second spatial light modulation tubes on a photocathode of a third spatial light modulation tube, said product thereof being obtained by multiplying operation where the data stored in said first and second spatial light modulation tubes are read out successively in this order;

an inverse multiple image formation system for forming an inverse multiple image of a product of outputs of said second and third spatial light modulation tubes on a light receiving means; and a data processing means for subjecting the output of said light receiving means to thresholding and for processing the input signal and the feed back signal.

11. An associative memory for storing and retrieving input data comprising:

a two-dimensional magnifying system for generating a first signal based on two-dimensional magnification of said input a reproducing system for generating a second signal having a multiplicity of simultaneously formed reproductions of said input data;

storing means for storing said input data, said storing including means for forming a memory matrix on the basis of first and second signals;

an inversely multiplying system for generating a third based on said memory means and said second signal; and output means for outputting said stored input data based on said third signal.

* * * * *

UNITED STATES PATENT AND TRADEMARK OFFICE

CERTIFICATE OF CORRECTION

PATENT NO. : 5,526,298
DATED : June 11, 1996
INVENTOR(S) : Naohisa MUKOHZAKA

It is certified that error appears in the above-indentified patent and that said Letters Patent is hereby corrected as shown below:

Claim 4, column 14, line 20, "claim 2" should read --claim 3--.

Claim 4, column 14, line 26, "fee back" should read --feed back--.

Claim 6, column 14, line 37, "claim 2" should read --claim 3--.

Claim 9, column 15, line 51, after "said first light", insert --modulation tube producing either an output representing a--.

Claim 11, column 16, line 41, after "input", insert -- data;--.

Claim 11, column 16, line 45, after "said storing", insert --means--.

UNITED STATES PATENT AND TRADEMARK OFFICE

CERTIFICATE OF CORRECTION

PATENT NO. : 5,526,298

DATED : June 11, 1996

INVENTOR(S) : Naohisa MUKOHZAKA

It is certified that error appears in the above-identified patent and that said Letters Patent is hereby corrected as shown below:

Claim 11, column 16, line 48, after "third", insert --signal--.

Signed and Sealed this

Second Day of December, 1997

Attest:

BRUCE LEHMAN

*Attesting Officer*

*Commissioner of Patents and Trademarks*